United States Patent [19]
Poisner

[11] Patent Number: 6,012,154
[45] Date of Patent: Jan. 4, 2000

[54] METHOD AND APPARATUS FOR DETECTING AND RECOVERING FROM COMPUTER SYSTEM MALFUNCTION

[75] Inventor: David I. Poisner, Folsom, Calif.

[73] Assignee: Intel Corporation, Santa Clara, Calif.

[21] Appl. No.: 08/933,260

[22] Filed: Sep. 18, 1997

[51] Int. Cl.[7] ............................................. G06F 11/00
[52] U.S. Cl. ................................. 714/55; 714/51
[58] Field of Search ..................... 395/185.08, 185.04, 395/185.01, 184.01; 714/55, 51, 49, 47

[56] References Cited

U.S. PATENT DOCUMENTS

| | | | |
|---|---|---|---|
| 4,410,938 | 10/1983 | Higashiyama | 364/200 |
| 4,594,685 | 6/1986 | Owens | 364/900 |
| 4,763,296 | 8/1988 | Gerekci | 364/900 |
| 4,809,280 | 2/1989 | Shonaka | 371/62 |
| 4,982,404 | 1/1991 | Hartman | 371/62 |
| 5,398,332 | 3/1995 | Komoda et al. | 395/575 |
| 5,408,643 | 4/1995 | Katayose | 395/575 |
| 5,408,645 | 4/1995 | Ikeda et al. | 395/575 |
| 5,513,319 | 4/1996 | Finch et al. | 395/185.08 |
| 5,638,510 | 6/1997 | Ishikawa | 395/185.04 |
| 5,761,414 | 6/1998 | Akaishi et al. | 395/185.08 |
| 5,768,620 | 6/1998 | Johnson et al. | 395/835 |
| 5,809,229 | 9/1998 | Moci | 395/185.08 |

*Primary Examiner*—Norman Michael Wright
*Attorney, Agent, or Firm*—Calvin E. Wells

[57] ABSTRACT

A timer is periodically reset by a software agent executing on a processor. If the timer is not reset within a predetermined period of time, an interrupt is generated. An interrupt handler then periodically resets the timer, and if the timer is not reset within an additional predetermined period of time, the computer system is partially reset.

12 Claims, 2 Drawing Sheets

METHOD AND APPARATUS FOR DETECTING AND RECOVERING FROM COMPUTER SYSTEM MALFUNCTION

RELATED APPLICATIONS

Reference is made to the following commonly assigned copending patent applications:

U.S. Ser. No. 08/935,115, entitled "Method and Apparatus for Detecting and Reporting Failed Microprocessor Reset"; and U.S. Ser. No. 08/933,629, entitled "Method and Apparatus for Reporting Malfunctioning Computer System", each of which is incorporated by reference herein.

BACKGROUND OF THE INVENTION

1. Field of the Invention

The present invention pertains to the field of computer systems. More particularly, this invention pertains to the field of detecting and recovering from computer system malfunctions.

2. Background of the Related Art

For many years, computer system manufacturers, computer component manufacturers, and computer users have been concerned with detecting and recovering from computer system malfunctions. There are many reasons why a computer system might malfunction, including memory data corruption, data corruption related to fixed disks or removable media, operating system errors, component errors, components overheating, applications or operating systems performing illegal instructions with respect to the processor, incompatibility between various hardware and software system components, etc.

Some of these types of malfunctions have been effectively dealt with by prior systems. For example, memory data corruption can be handled by parity detection and/or error correcting code (ECC). Illegal instructions can be trapped by the processor and in many cases handled either within the processor or by the operating system. Other malfunctions may result in system "hangs." A system is "hanged" when it is no longer able to respond to user inputs. Some malfunctions that can result in system hangs include operating systems or hardware components entering unknown or indeterminate states, causing the operating system or hardware component to cease normal operation. In these cases, the computer user must restart the computer. Restarting the computer after a system hang can cause problems such as data loss and corruption.

Some prior computer systems have included timers known as "watchdog" timers. A typical watchdog timer implementation involves a processor periodically resetting a timer, and under normal operation the timer never reaches a certain value. If the timer ever reaches the certain value, the computer system is reset. This solution causes no action to take place to attempt to cure the malfunction other than to take the drastic action of resetting the computer system. Resetting the computer system may result in the same problems mentioned above with regard to a user restarting a computer, including data loss and corruption.

Separate error checking processors have been included in computer systems in order to detect and attempt to recover from system hangs. This solution has the disadvantage of being costly. The computer user benefits from less costly computer systems. Therefore, a lower cost method and apparatus for detecting and recovering from computer system malfunctions is desirable.

SUMMARY OF THE INVENTION

A method and apparatus for detecting and recovering from a computer system malfunction is disclosed. A timer is periodically reset by a software agent executing on a processor. If the timer is not reset within a determined period of time, an interrupt is generated. An interrupt handler then periodically resets the timer, and if the timer is not reset within an additional predetermined period of time, the computer system is at least partially reset.

DETAILED DESCRIPTION

A method and apparatus for detecting and recovering from computer system malfunctions is disclosed. In the following description, for the purposes of explanation, specific details are set forth to provide a thorough understanding of the invention. However, it will be apparent to one skilled in the art that these specific details are not required to practice the invention. In other instances, well known methods, devices, and structures are not described in particular detail in order to avoid obscuring the invention.

Overview

The invention solves the problem of detecting and recovering from computer system malfunctions. In general, and in accordance with one embodiment of the invention, a timer is set upon starting the computer. An operating system-related software agent running on a processor periodically resets the timer. If the timer ever expires, an interrupt is generated which causes the processor to execute an interrupt handler which is unrelated to the operating system. The term "interrupt" as used herein includes all manner of interrupts, including, but not limited to, Peripheral Component Interconnect (PCI) interrupts, Industry Standard Architecture (ISA) interrupts, System Management Interrupts (SMI), and Non-Maskable Interrupts (NMI). When the interrupt handler is called, the timer is reset to its initial value. The interrupt handler causes the timer to be periodically reset while it attempts to cure the malfunction that caused the timer to expire previously. If the timer expires while the interrupt handler is executing, a partial reset is performed. The partial reset fully resets the processor and further resets portions of other system components. The partial reset allows the state of the various system components to be maintained while the system is restarted.

Embodiments of the Invention

Figure 1:
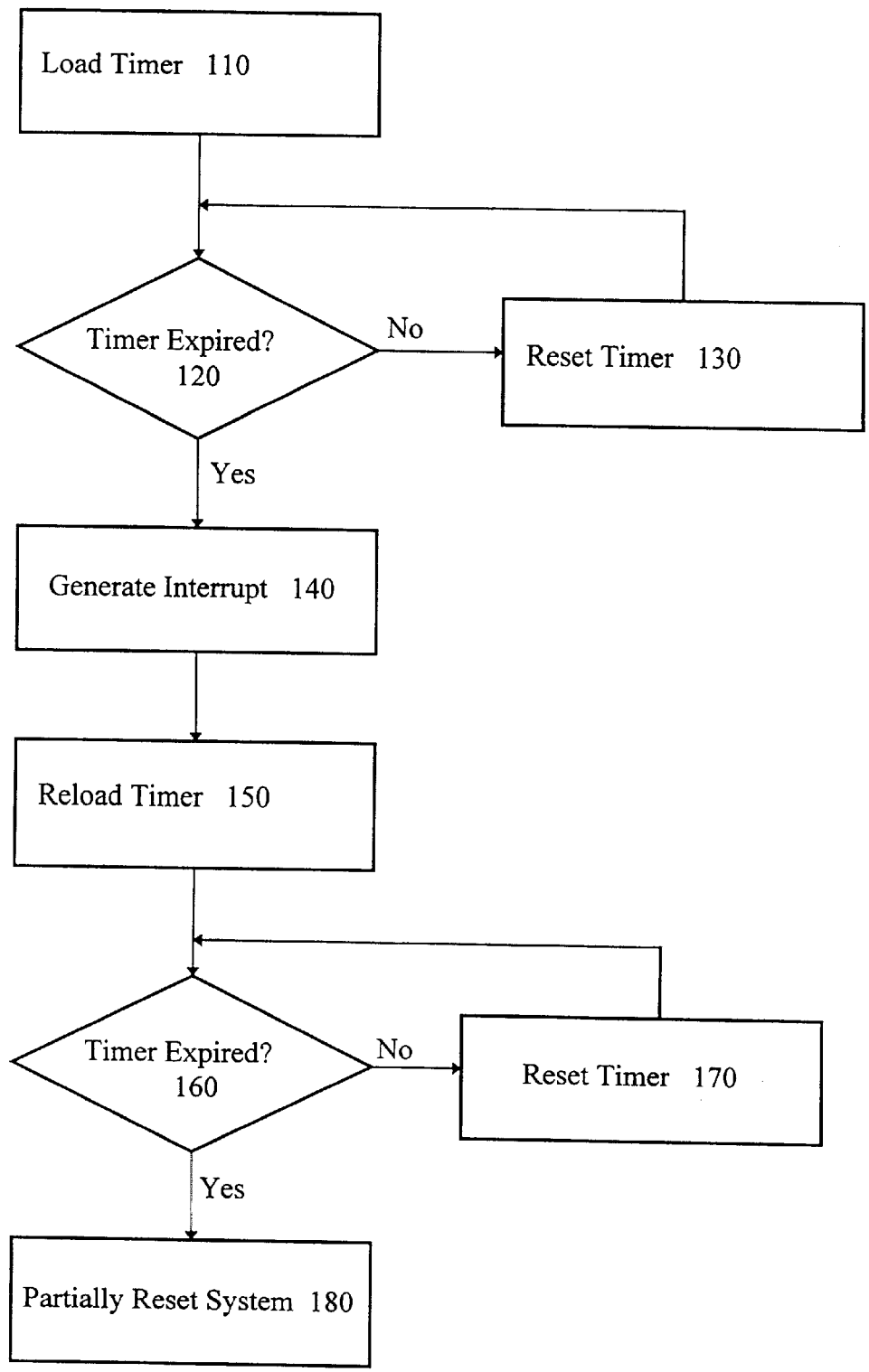
FIG. 1 shows a flow diagram of a method for detecting and recovering from a computer system malfunction implemented in accordance with one embodiment of the invention.

FIG. 1 shows a flow diagram of a method for detecting and recovering from a computer system malfunction implemented in accordance with one embodiment of the invention. At step 110, a timer is loaded. The timer may be a count-down timer that is initially loaded with a value and over a period of time counts down to zero unless it is reloaded. Other types of timers or counters may also be used with the invention, including counters that start at a value and count up until a trigger value is reached. In the present embodiment, the timer is of the count-down type. The timer is initially loaded upon system start up as part of the boot process.

Following the load timer step 110, the timer is checked after a period of time at step 120 in order to determine whether the timer has expired. The checking is preferably performed by a software agent running on a processor. The software agent is typically related to an operating system. If the timer has not expired, the software agent causes the timer to be reset at step 130. Following step 130, the timer is again rechecked after a period of time at step 120. Steps 120 and 130 are repeated continuously so long as no computer system malfunction exists that would prevent the software agent from resetting the timer. Malfunctions that would prevent the timer from being reset include the operating system misbehaving in such a manner that it is unable to schedule and run the software agent. Another possible malfunction that would prevent the software agent from resetting the timer is a broken data or address path between the processor and the timer such that even though the operating system is behaving properly and the processor is able to run the software agent, the processor is not able to cause the timer to be reloaded. The processor itself may also malfunction in such a manner that it is unable to execute the software agent. Other malfunctions are possible, including the operating system waiting for a misbehaving peripheral.

If the timer does expire, an interrupt is generated at step 140. In this embodiment, the generated interrupt causes the processor to execute an interrupt handler. As mentioned above, it is possible that a processor malfunction caused the timer to expire. If the processor is not operating properly, it likely will not be able to execute the interrupt handler. This case is discussed below. The discussion below regarding the execution of the interrupt handler assumes that the processor is operating in such a manner that it is able to execute the handler.

The interrupt handler is not related to the operating system and is stored in nonoperating system memory space. Since the interrupt handler is not related to the operating system, the processor is able to execute the interrupt handler even if the operating system is behaving improperly. The interrupt handler attempts to investigate and cure the malfunction that allowed the timer to expire. It is possible for the interrupt handler to attempt to cure a broad range of possible system malfunctions.

Upon the generation of the interrupt, the timer is reloaded at step 150. The reloading is preferably accomplished automatically by system logic. The processor cannot be relied on to perform the reload timer step 150 since a processor malfunction may have resulted in the timer expiring.

The interrupt handler checks the timer to see if it has expired a second time at step 160. If the timer has not expired, the timer is reset by the interrupt handler at step 170. Steps 160 and 170 are periodically repeated so long as the interrupt handler is executing. If the timer expires a second time, it is likely an indication that either the processor is unable to execute the interrupt handler or there is a broken data or address path between the processor and the timer such that even if the processor is able to properly execute the interrupt handler the timer is never reset.

If the timer expires a second time, a system reset occurs at step 180. Preferably, the system reset is a partial system reset. A partial system reset may involve the processor, the memory controller, and portions of system peripherals. The partial system reset seeks to retain system state information so that the system can attempt to cure system malfunctions during the reboot process. An indication is preferably maintained by the system logic that indicates to the system Basic Input/Output System (BIOS) that the current boot process was triggered by a partial system reset and that steps should be taken to investigate and attempt to cure any system malfunctions.

In an alternative embodiment, the timer is reloaded a second time upon the generation of the partial system reset. The BIOS periodically resets the timer during the boot process and while it attempts to cure any malfunctions. Should the timer expire a third time, a more complete system reset is performed and the boot process is attempted again. The steps of loading the timer, periodically resetting the timer during the boot process and while attempting to cure the malfunction, and performing a more complete system reset can be repeated any number of times. Each time the timer expires, more severe actions can be performed in order to attempt to cure the malfunction. The most severe action might include powering down and then powering up the system.

Figure 2:
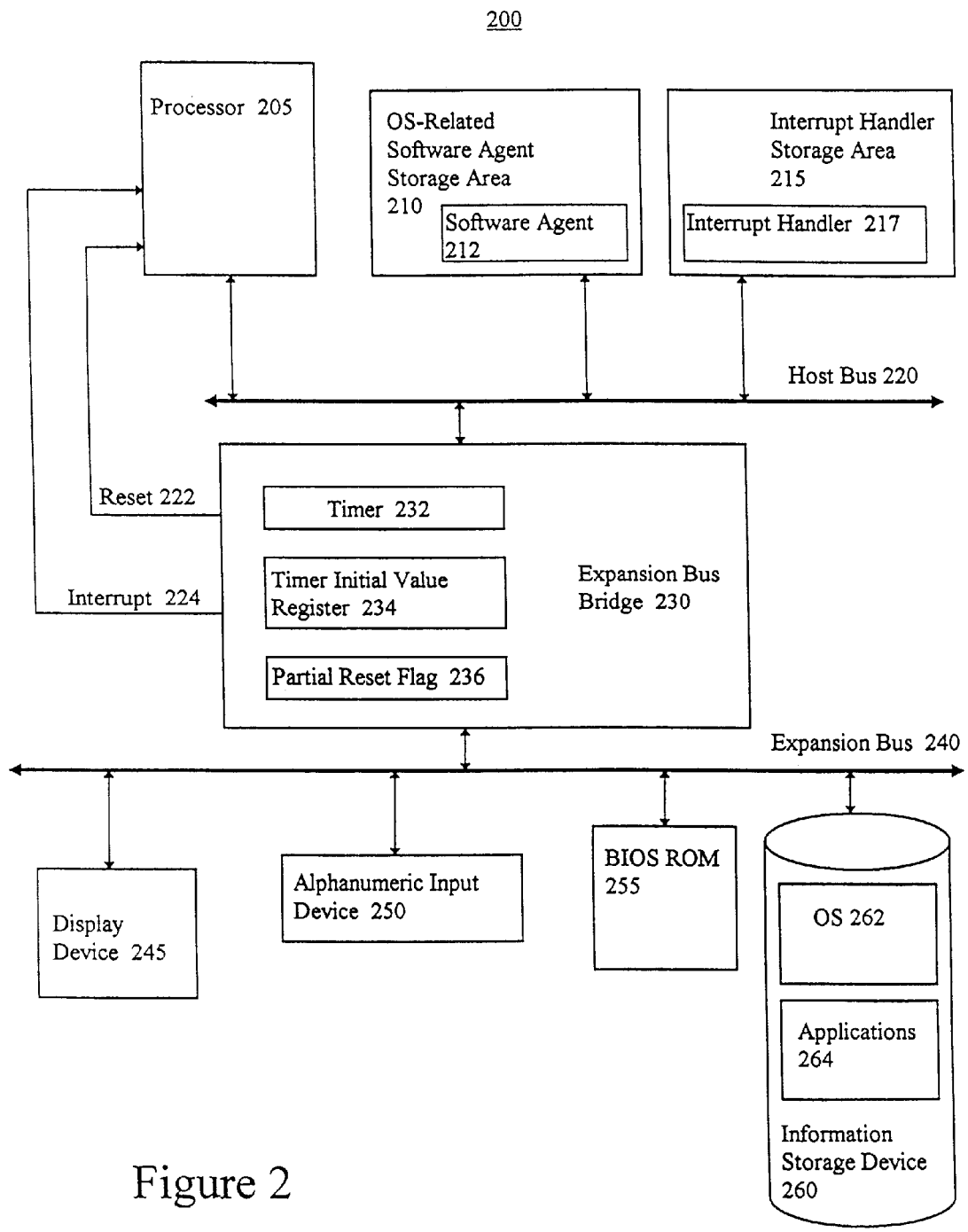
FIG. 2 depicts a block diagram of computer system implemented in accordance with one embodiment of the invention.

FIG. 2 depicts a block diagram of a computer system 200 implemented in accordance with one embodiment of the invention. The computer system 200 typically includes a host bus 220 for communicating information, such as instructions and data. The system further includes a processor 205, coupled to the host bus 220, for processing information according to programmed instructions, and memory devices including an operating system-related software agent storage area 210 and an interrupt handler storage area 215 coupled to the host bus 220 for storing information for processor 205. The storage area 210 has stored therein a software agent 212 and the storage area 215 has stored therein an interrupt handler 217.

The processor 205 could be an 80960, 386, 486, Pentium® processor, Pentium® Pro processor, or Pentium® II processor made by Intel Corp., among others, including processors that are compatible with those listed above. The memory devices 210 and 215 may include a random access memory (RAM) to store dynamic information for processor 205, a read-only memory (ROM) to store static information and instructions for processor 205, or a combination of both types of memory.

An expansion bus bridge 230 couples the host bus 220 to an expansion bus 240. Devices coupled to the expansion bus 240 include a display device 245, and alphanumeric input device 250, a BIOS read-only memory 255, and an information storage device 260 for storing information including an operating system 262 and applications 264.

In alternative designs for the computer system 200, information storage device 260 could be any medium for storage of computer readable information. Suitable candidates include a read-only memory (ROM), a hard disk drive, a disk drive with removable media (e.g., a floppy magnetic disk or an optical disk), or a tape drive with removable media (e.g., magnetic tape), synchronous DRAM or a flash memory (i.e., a disk-like storage device implemented with flash semiconductor memory). A combination of these, or other devices that support reading or writing computer readable media, could be used.

The display device 245 may be a liquid crystal display, a cathode ray tube, or any other device suitable for creating graphic images or alphanumeric characters recognizable to the user. The alphanumeric input device 612 typically is a keyboard with alphabetic, numeric, and function keys, but it may be a touch sensitive screen or other device operable to input alphabetic or numeric characters.

The expansion bus bridge 230 includes a timer 232, a timer initial value register 234, and a partial reset flag 236. The timer 232, timer initial value register 234, and partial reset flag 236 are not restricted to being included in the expansion bus bridge, but may be located elsewhere in the system.

Upon system start-up, the timer 232 is loaded with the value stored in the timer initial value register 234. The timer 232 is then periodically reset with the value stored in register 234 by the software agent 212. The software agent 212 is periodically scheduled to execute on the processor by the operating system 262. If the timer 232 expires, an interrupt signal 224 is asserted to the processor 205. The interrupt signal 224 causes the processor to execute the interrupt handler 217. Also, when the timer 232 expires the timer 232 is automatically reloaded with the value stored in register 234.

The interrupt handler 217 attempts to investigate and cure any system malfunction that resulted in the timer 232 expiring. Further, while the interrupt handler 217 is executing it periodically resets the timer 232 in order to prevent it from expiring again.

If the timer 232 expires a second time, a reset signal 222 is sent to the processor. The reset signal 222 may also be communicated to other system devices. The reset signal 222 causes the processor and possible other devices to perform a partial reset. The partial system reset is discussed above in connection with FIG. 1. When the reset signal 222 is asserted, the partial system reset flag 236 is set. When the system restarts as a result of the partial system reset, the BIOS (stored in BIOS ROM 255), when executed by the processor 205 during the boot process, will cause the partial reset flag 236 to be read in order to determine whether a partial reset has occurred. If the flag is set, the BIOS will attempt to cure any system defects, as discussed above in connection with FIG. 1.

It will be clear to one skilled in the art that the invention can operate upon a wide range of programmable computer systems, not just the example computer system 200.

In the foregoing specification the invention has been described with reference to specific exemplary embodiments thereof It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A method, comprising the steps of:
   periodically resetting a timer, the step of resetting the timer performed by a software agent executed on a processor;
   triggering an interrupt if the timer is not reset within a predetermined period of time, the interrupt to indicate a malfunction;
   executing an interrupt handler if the interrupt is triggered, the interrupt handler to cause the timer to be periodically reset, the interrupt handler to function independently of the software agent and the interrupt handler to attempt to cure the malfunction; and
   performing at least a partial reset of the computer system if the timer is not reset by the interrupt handler within an additional predetermined period of time.

2. The method of claim 1 wherein the step of periodically resetting a timer includes executing an operating system-related software agent on a processor.

3. The method of claim 1 further comprising the step of initially loading the timer with a value stored in a register.

4. The method of claim 3 wherein the step of periodically resetting the timer includes the step of loading the timer with a value stored in a register.

5. The method of claim 4, wherein the step of executing an interrupt handler includes the step of loading the timer with a value stored in register.

6. The method of claim 1 further comprising the step of providing an indication accessible to the processor that the step of performing at least a partial reset of the computer system has been performed.

7. The method of claim 1 further comprising the step of fully resetting the computer system if the step of performing at least a partial reset of the computer system is not successful in curing the malfunction.

8. The method of claim 1 wherein the step of periodically resetting a timer includes periodically resetting a first timer, the step of triggering an interrupt includes triggering an interrupt if the first timer is not reset after a predetermined period of time, the step of executing an interrupt handler includes causing a second timer to be periodically reset, and the step of performing at least a partial reset of the computer system includes partially resetting the computer system if the second timer is not reset after a predetermined period of time.

9. A computer system, comprising:
   a processor coupled to a bus;
   a first storage area coupled to the bus, the first storage area to store an operating system-related software agent that when executed by the processor causes a first timer to be periodically reset;
   circuitry for signaling an interrupt to the processor when the first timer is not reset after a predetermined period of time, the interrupt to indicate a malfunction;
   a second storage area coupled to the bus, the second storage area to store an interrupt handler that functions independently of the operating system-related software agent, the interrupt handler to cause a second timer to be periodically reset when executed by the processor and the interrupt handler to attempt to cure the malfunction; and
   circuitry for causing at least a partial system reset when the second timer is not reset after a predetermined period of time.

10. The system of claim 9 further comprising a flag for indicating that a partial system reset has occurred.

11. The system of claim 9 wherein the first and second timers are implemented as a single, reloadable timer.

12. The system of claim 11 further including circuitry for loading the reloadable timer with a value stored in a register.

* * * * *

UNITED STATES PATENT AND TRADEMARK OFFICE
CERTIFICATE OF CORRECTION

PATENT NO.   : 6,012,154
DATED        : January 4, 2000
INVENTOR(S)  : Poisner

It is certified that error appears in the above-identified patent and that said Letters Patent is hereby corrected as shown below:

Column 2, line 6, delete "determined" and insert -- predetermined --.

Signed and Sealed this

Twelfth Day of December, 2000

Attest:

Attesting Officer

Q. TODD DICKINSON

Director of Patents and Trademarks